US010560539B1

(12) United States Patent
Loch et al.

(10) Patent No.: US 10,560,539 B1
(45) Date of Patent: Feb. 11, 2020

(54) AUTOMATIC SCRIPT CODE COVERAGE MEASUREMENTS FOR SOFTWARE SCRIPTS (71) Applicant: SAP SE, Walldorf (DE)

(72) Inventors: Florian Loch, Karlsruhe (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/136,628

(22) Filed: Sep. 20, 2018

(51) Int. Cl.
G06F 9/44 (2018.01)
H04L 29/08 (2006.01)
G06F 11/36 (2006.01)
G06F 9/445 (2018.01)
G06F 16/95 (2019.01)

(52) U.S. Cl.
CPC .......... H04L 67/22 (2013.01); G06F 9/44526 (2013.01); G06F 11/3612 (2013.01); G06F 11/3676 (2013.01); G06F 16/95 (2019.01); H04L 67/34 (2013.01); H04L 67/10 (2013.01)

(58) Field of Classification Search
CPC .. G06F 16/972; G06F 21/577; G06F 11/3672; G06F 11/3676; G06F 11/3612; G06F 9/44526; H04L 67/34; H04L 29/06; H04L 67/22; H04N 21/252
See application file for complete search history.

(56) References Cited

U.S. PATENT DOCUMENTS

| 10,270,886 | B1* | 4/2019 | Postelnik | H04L 67/34 |
| 2003/0131052 | A1* | 7/2003 | Allan | H04L 29/06 709/203 |
| 2003/0159063 | A1* | 8/2003 | Apfelbaum | G06F 21/577 726/25 |
| 2014/0089904 | A1* | 3/2014 | Wray | G06F 11/3672 717/135 |
| 2015/0082286 | A1* | 3/2015 | Gittelman | G06F 11/3676 717/130 |
| 2016/0205166 | A1* | 7/2016 | Kolam | G06F 16/972 709/213 |
| 2017/0171620 | A1* | 6/2017 | Oren | H04N 21/252 |

* cited by examiner

Primary Examiner — Tuan A Vu
(74) Attorney, Agent, or Firm — Schwegman Lundberg & Woessner, P.A.

(57) ABSTRACT

In an example embodiment, a proxy server receives a request from a web browser operated on a client device, the request including a call for computer code written in a scripting language. The request is forwarded to a web server to obtain the computer code written in the scripting language. The computer code written in the scripting language is automatically instrumented by adding instrumentation code to the computer code written in the scripting language, the instrumentation code configured to, when executed, measure one or more metrics and report the resultant measurements. Then the instrumented computer code written in the scripting language is sent to the web browser for execution.

17 Claims, 8 Drawing Sheets

AUTOMATIC SCRIPT CODE COVERAGE MEASUREMENTS FOR SOFTWARE SCRIPTS

TECHNICAL FIELD

This document generally relates to the analysis of computer code. More specifically, this document relates to automatic script code coverage measurements in the presence of client-side code composition.

BACKGROUND

Static code analysis is the analysis of computer software performed without actually executing the software being analyzed. The term is usually applied to the analysis performed by an automated tool. The analyses performed by these tools vary from those that only consider the behavior of individual statements and declarations to those that include an analysis of the complete source code of a program.

In contrast, dynamic code analysis is executed while a program is in operation. A dynamic test may monitor system memory, functional behavior, response time, and overall performance of the system, as well as other parameters not testable with static code analysis. One common use for code analysis in general is to identify malicious code through a security assurance process. During dynamic code security tests, only the code that is actually executed is subject to the security assurance process. All code portions that are not executed remain untested. Furthermore, without additional effort, there is no information or measurement about the amount of code testing coverage achieved during the dynamic test. While this problem is shared among all dynamic security testing approaches and domains, it is significantly elevated for security testing of client-side script, such as JavaScript, in the web browser. In modern web applications, the browser is often used as a means for client-side composition of code from multiple, heterogeneous sources, each under the control of a different code provider. Hence, standard code coverage measurement mechanisms are not available as they require a single source of code control.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, an intercepting Hypertext Transfer Protocol Secure (HTTPS) proxy is used. All requests made by a security researcher's browser are then redirected through the proxy. The proxy is therefore able to transparently perform the necessary instrumentation of all script code requested by the browser on-the-fly using an existing code coverage instrumentation tool. As such, the code actually executed by the browser is capable of tracking its execution regarding coverage itself.

This information needs to be retrieved from the page-under-test's execution context. This may be performed by a browser extension. Furthermore, in order to not only provide the security researcher with information regarding the page's/application's code coverage but also to help it be increased, the browser extension provides functionality to simulate user interaction by triggering one or more event handlers bound to user interface elements.

As such, in an example embodiment, the client-side, runtime instrumentation of the full set of included code which includes all script resources that are retrieved from external, third party hosts, is provided. Thus, script that is not under the developer's control is supported. The instrumentation is performed completely application agnostic via a client-side HTTPS proxy. Client-side, page-specific evaluation of the achieved code coverage is provided, supported by an interactive, browser-based user interface. On-the-fly, page-specific code coverage is provided via automatic interaction with identified user interface elements.

During the last few years, many applications that have traditionally been implemented as desktop applications have been moved the web. The attacks targeting those applications are also on the rise. Cross-site Scripting (XSS), a subtype of the class of Injection Attacks, is causing harm to institutions, companies, and individuals.

Taint tracking has been proven, under laboratory conditions and in real-world field studies, to be an effective mechanism to detect and possibly also prevent, or at least mitigate, a wide range of injection attacks including popular ones like forms of XSS. But as taint tracking is a dynamic analysis, it can only assure the security of an application regarding a checked threat for code/paths that have actually been executed. Therefore, the significance of such analysis results depends on the amount of run code/paths. But of much greater importance is the fact that it can be used to determine which parts of an application have not yet been tracked (and therefore analyzed) and need further attention.

Code coverage describes the concept of measuring how much of an application's code is executed, usually used in the context of software tests in order to see how well they actually cover an application's code base. Combined with taint tracking, the different measures of code coverage can be used to determine which portions of an application have been checked by the dynamic analysis. Code coverage may be measured by instrumenting an application's code in a way to make it able to record its own execution, i.e., which statements, branches, paths, and so forth have been executed at runtime. Alternatively, the runtime environment might keep track of this.

On an abstract level, preprocessing a traditional desktop application, particularly its source code, in order to be able to measure the code coverage of an execution can be considered straightforward as all code is available and the results can simply be written to disk. However, it becomes much more complicated when trying to measure these metrics for JavaScript code as part of web pages or web applications.

XSS is a subclass of injection attacks, in which the to-be-influenced, interpreting downstream-component is a browser, particularly its HyperText Markup Language (HTML) and JavaScript parsers/interpreters. An attacker tries to make a user's browser execute his own commands by injecting malicious code into an otherwise benign page, abusing the user's (and the browser's) trust into this page.

Browsers restrict access to sensitive information stored on the client as well as network requests according to a Same-Origin Policy (SOP). The SOP is a sophisticated mechanism defining how documents and scripts can interact with resources linked to origins other than the one they were retrieved from. This basically means that only documents and scripts retrieved from the same origin are allowed to access resources linked to this origin.

As the injected code runs in the context of a given origin, an attacker could, e.g., steal a session token stored in a cookie and impersonate as a legit user or could send further requests and directly operate in the user's authentication context. The attacker could also modify the appearance of the site in order to, e.g., make it look like the portal of the user's online bank and make the user enter his credentials.

In case of reflected XSS and persisted XSS, the malicious payload inevitably has to be received and forwarded by the server-side application. With Document Object Model (DOM)-based XSS this is different, as this way of playing does not require a page-generating server to inject the exploit. This subspecies differs because the malicious payload is never part of the raw HTML.

Below is such an example
```
<!-- A URL might be:
www.example.com/
   dom_based_xss.html#name=Mallory-->
<HTML>
   <TITLE>Welcome!</TITLE>
   Hi
   <SCRIPT>
      var pos=window.location.hash.indexOf("name=")+
        5;
      document.write(window.location.hash.substring
        (pos));
   </SCRIPT>
   <BR>
   Welcome to our system!
   ...
</HTML>
```

In HTTP, the communication follows the client-server principle, usually with a browser being the client and a web server answering its requests. A server might also be a proxy server receiving a client's request and forwarding it to the actual target.

The basic mechanism of a HTTP proxy is as follows. The client usually needs to be aware of the proxy in order to slightly modify its requests and to send them to the proxy instead of the actual target host. After receiving the request, the proxy can perform modifications to it and forward it to the target system or another proxy. The fetched response is then transferred back to the client, possibly after being modified.

If the client wants to communicate securely using HTTP on top of Transport Layer Security (TLS), then the setup can be a little more complicated, as the client does not want a proxy to be able to actually see the content of either the request or response in a security sensitive context. Simply redirecting the client's requests to the proxy server does not work as the latter would not be able to initialize the required TLS connection because it cannot authenticate as the target system. Therefore, a client might use a second way of interacting with a proxy server by sending a request to it using HTTP's CONNECT method. Using this, the client requests it to provide a plain Transport Control Protocol (TCP) connection towards the target host on top of which the TLS connection can be initialized (without giving the proxy any chance to read or modify the HTTP messages sent.)

In a controlled environment, however, the TLS protection can be broken up. In a nutshell, the security of TLS, and more precisely its initial handshake, regarding such a Man-in-the-middle (MITM) attack is based on certificates attesting a server to be authentic for a given domain. Certificates are signed by a certification authority (CA), which is linked to at least one so called "root CA" by a "chain of trust." These root CAs are also called "trust anchors" and are preinstalled into a browser or the operating system in order to verify a chain of certificates and therefore ultimately the authenticity of a TLS counterpart.

By providing the client another root CA under one's control, one can generate arbitrary certificates attesting a proxy to be a valid counterpart for a requested TLS connection. Since the client can verify these certificates using the additional root CA, it will perform the TLS initialization enabling the proxy to read and modify the communication as before.

The idea of measuring code's coverage originates from the domain of software engineering and more specifically from software testing. By measuring how much of an application's code base has been executed during execution of a test suite, a rough estimation of the quality of the tests can be given. Specifically, parts of the code base not being covered by tests so far can be identified and further tests can be written in a more targeted manner.

But the idea of code coverage is not restricted to testing software for bugs or misbehavior. It might also be used when checking applications for weaknesses and vulnerabilities using dynamic analysis mechanisms by indicating which parts have not yet been checked. The concept of measuring code coverage is therefore of great interest when analyzing web pages regarding XSS vulnerabilities using a dynamic analysis like taint tracking.

There are two potential strategies on how two measure the code coverage with JavaScript. The first is to modify the evaluating JavaScript engine in order to keep track of the code executed by it. However, modifying a JavaScript engine would require a lot of effort. The second one is to instrument, i.e., rewrite the application's source code, in order to be capable of tracking its execution on its own while being executed. This does not need any modifications to existing runtimes. There are several metrics describing the coverage achieved by an applications execution. The most relevant are: statement coverage, line coverage, branch coverage, and function coverage.

Measuring (and increasing) the code coverage of the client-side JavaScript in a dynamic security testing tool is highly problematic, due to three distinct reasons:

1. The full set of executed JavaScript is only determined at runtime, server-side generation of the hosting HTML web container
2. The full set of executed JavaScript may be partially generated on-the-fly by the server-side code
3. The full set of executed JavaScript may only be partially controlled by the main application under test and may instead be provided by and retrieved from external, third party script providers.

Figure 1:
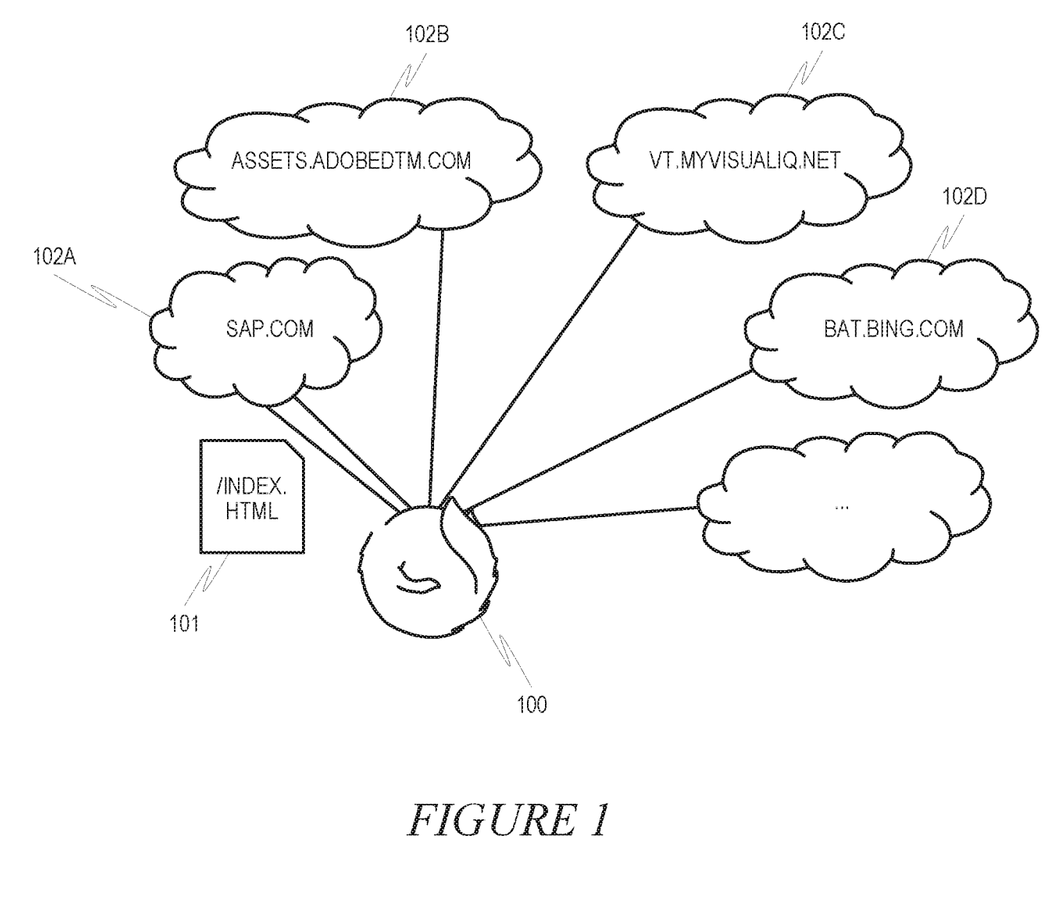
FIG. 1 is a diagram illustrating an example of a browser fetching scripts from various resources, in accordance with an example embodiment.

All JavaScripts included in a web document run in one shared global space, effectively building one interconnected code base. For example, processing of the HTML page retrieved by a request to https://sap.com/index.html results in a lot of additional requests to various hosts in order to fetch the included JavaScript files. FIG. 1 is a diagram illustrating an example of a browser 100 fetching scripts from various resources 102A-102D, in accordance with an example embodiment. Specifically, browser 100 executes web page 101, which contains JavaScript calls to resources 102A-102D to fetch stated JavaScript resources. All of these scripts add to the attack surface of the client-side code and have to be tested. Thus, for effective code coverage to be measured, the given combination and the full set of JavaScript resources has to be considered/analyzed.

Figure 2:
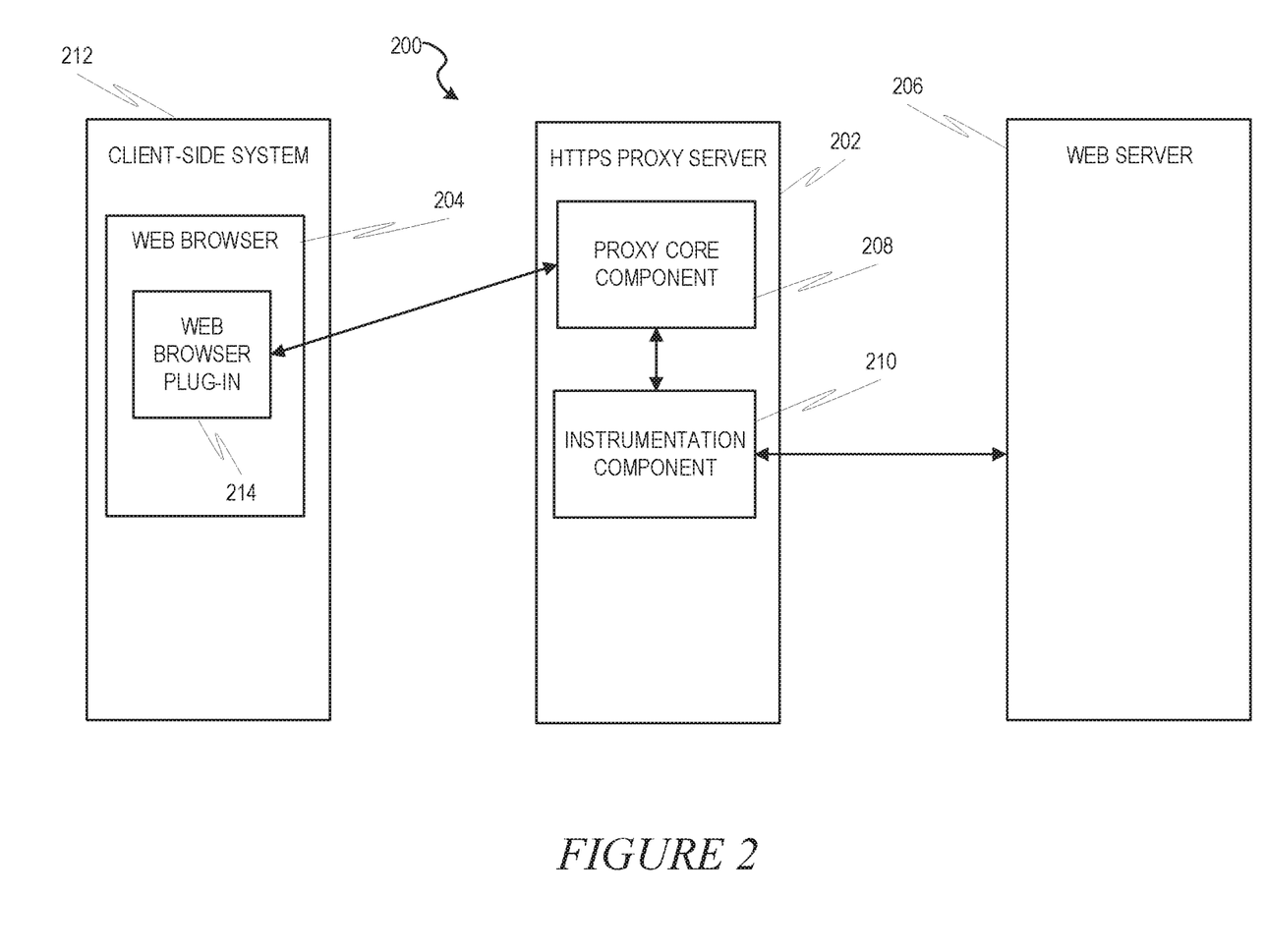
FIG. 2 is a block diagram illustrating a system, in accordance with an example embodiment.

FIG. 2 is a block diagram illustrating a system 200, in accordance with an example embodiment. Here, an HTTPS proxy server 202 has been inserted in a network 200. Traditionally, a web browser client 204 may send HTTP requests directly to a web server 206. Now, however, the web browser client 206 sends requests to the HTTPS proxy server 202 via HTTPS. The HTTPS proxy server 202 contains a proxy core component 208 and an instrumentation component 210. The proxy core component 208 acts to perform tasks related to receiving and sending HTTPS messages. The instrumentation component 210 acts to insert the appropriate instrumentation code into each portion of the relevant script.

On the client-side system 212, a web browser 204 may include a web browser plug-in 214 that points requests to the HTTPS proxy server 202. The web browser 216 receives and executes instrumented JavaScript from the HTTPS proxy server 202, which causes the web browser 204 to evaluate the coverage information and trigger any event handlers.

Figure 3:
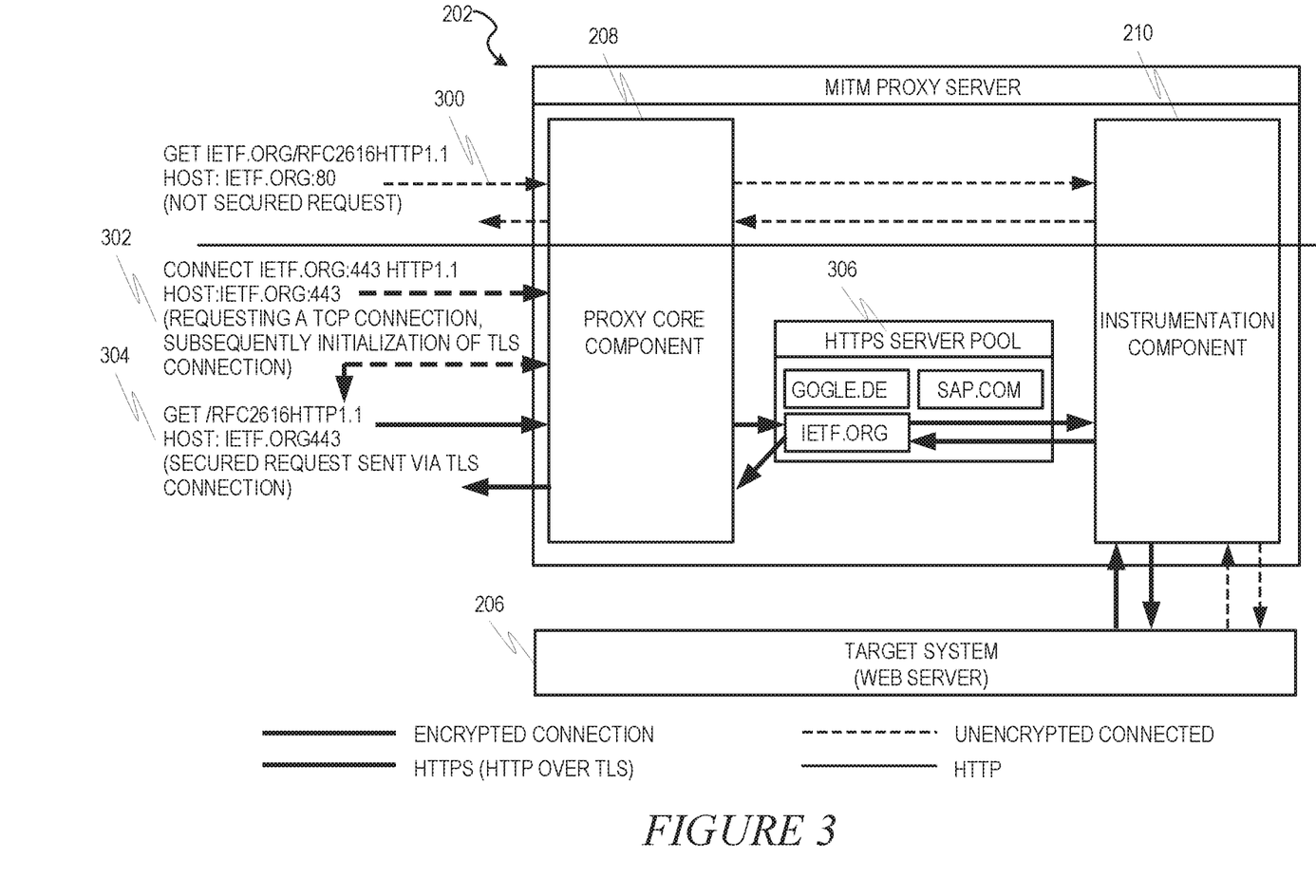
FIG. 3 is a block diagram illustrating the HyperText Transfer Protocol Secure (HTTPS) proxy server in more detail, in accordance with an example embodiment.

FIG. 3 is a block diagram illustrating the HTTPS proxy server 202 in more detail, in accordance with an example embodiment. This figure illustrates how HTTP and HTTPS communication is handled between the proxy core component 208 and the instrumentation component 210. Specifically, unsecured requests, such as request 300 may be passed from the proxy core component 208 to the instrumentation component 210 directly. A secure connect request 302 may be handled by the proxy core component to initialize a TLS connection. A secure get request 304 may cause the proxy core component 208 to utilize an HTTPS server pool 306 prior to sending to the instrumentation component 210. The HTTPS server pool can be used to provide concurrent connection to other servers handled by the HTTPS proxy server 204 at the same time. For both secure and unsecure get requests, the instrumentation component 210 sends the request to the web server 206 and waits for a response. The web server 206 winds up performing an execution of the appropriate JavaScripts including any referenced JavaScripts within the JavaScript. In that way, the instrumentation component 210 is able to know how to instrument not only the directly called script but also any scripts called by the directly-called scripts (or scripts called by those scripts, and so on).

As described before, in an example embodiment, preprocessing/instrumentation of the JavaScript code needs to be performed inside a HTTP(S) proxy as performing it not possible on the server-side or on the client-side.

After receiving an HTTP request, including the ones retrieved on top of a TLS connection, the proxy forwards this to the target system and waits for the response.

There are two possibilities of on how JavaScript code might be delivered to a client: either in a standalone file or as part of a HTML page embedded via a pair of <script></script> tags.

In the case where the code had been embedded into HTML, the code needs to be extracted before processing and it has to be re-embedded again afterwards. Then the HTML or JavaScript file gets delivered to the actual client requesting it from the proxy.

Figure 4:
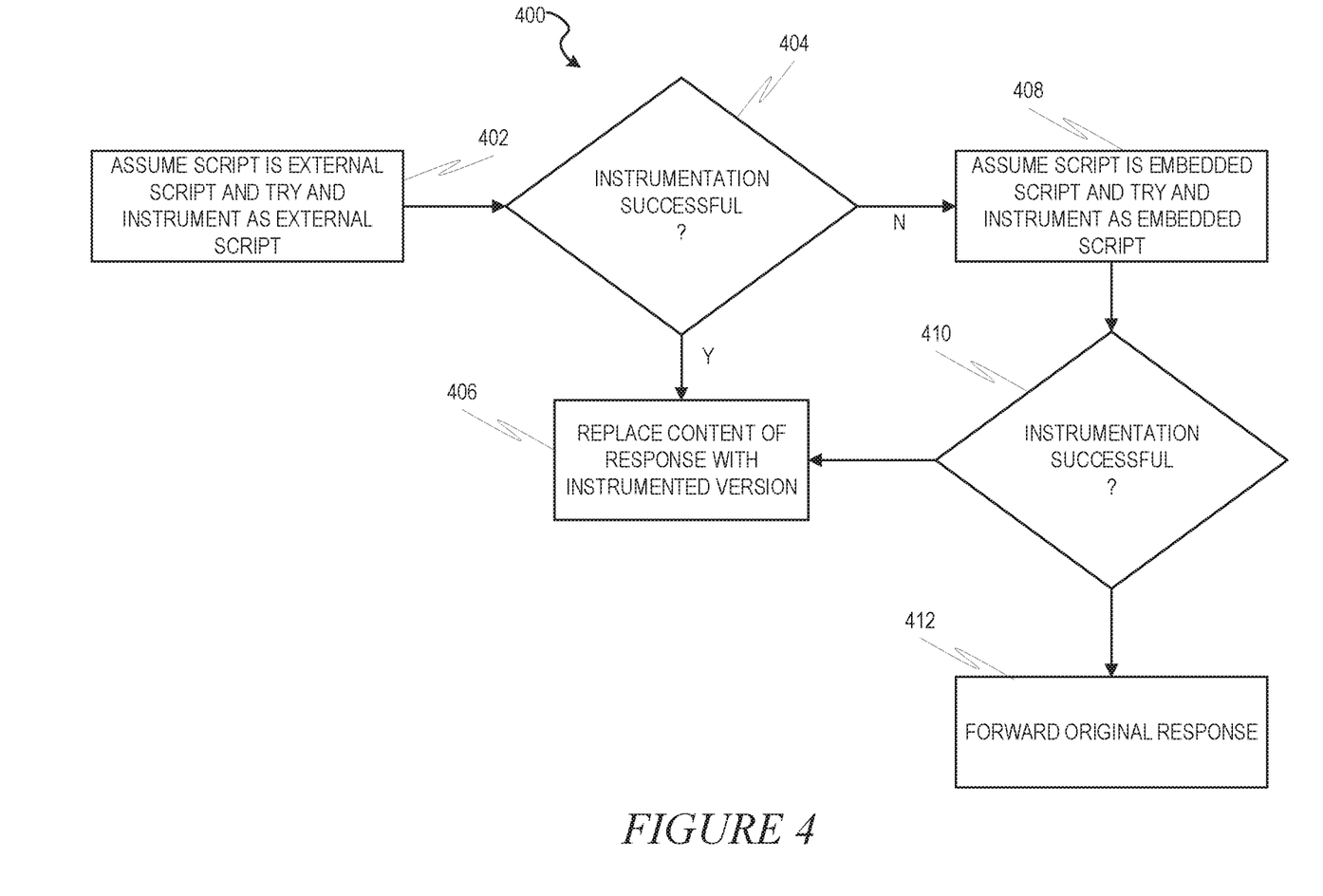
FIG. 4 is a flow diagram illustrating a method of schematic processing of a JavaScript code received as a response from the web server, in accordance with an example embodiment.

FIG. 4 is a flow diagram illustrating a method 400 of schematic processing of a JavaScript code received as a response from the web server 208, in accordance with an example embodiment.

At operation 402, the instrumentation component 210 assumes the returned script is an external script and tries to instrument it. At operation 404, it is determined if instrumentation was successful. If so, then at operation 406, the content of the response is replaced with the instrumented version. If not, then at operation 408 the instrumentation component 210 assumes the returned script is an embedded script and tries to instrument it. At operation 410, it is determined if instrumentation was successful. If so, the method 400 proceeds to replace the content at operation 406. If not, then at operation 412 the original response is forwarded.

In an example embodiment, the coverage information gets computed at runtime inside the browser performing the dynamic analysis and is stored in an additional global JavaScript property added to the document's shared, global space. It can be extracted using a browser extension by injecting an additional script into the execution context transferring the measurements results to the extension. As one HTML page night contain multiple documents by using HTML Frames in a Frameset or via iFrames, all of them get the "extraction code" injected.

Figure 5:
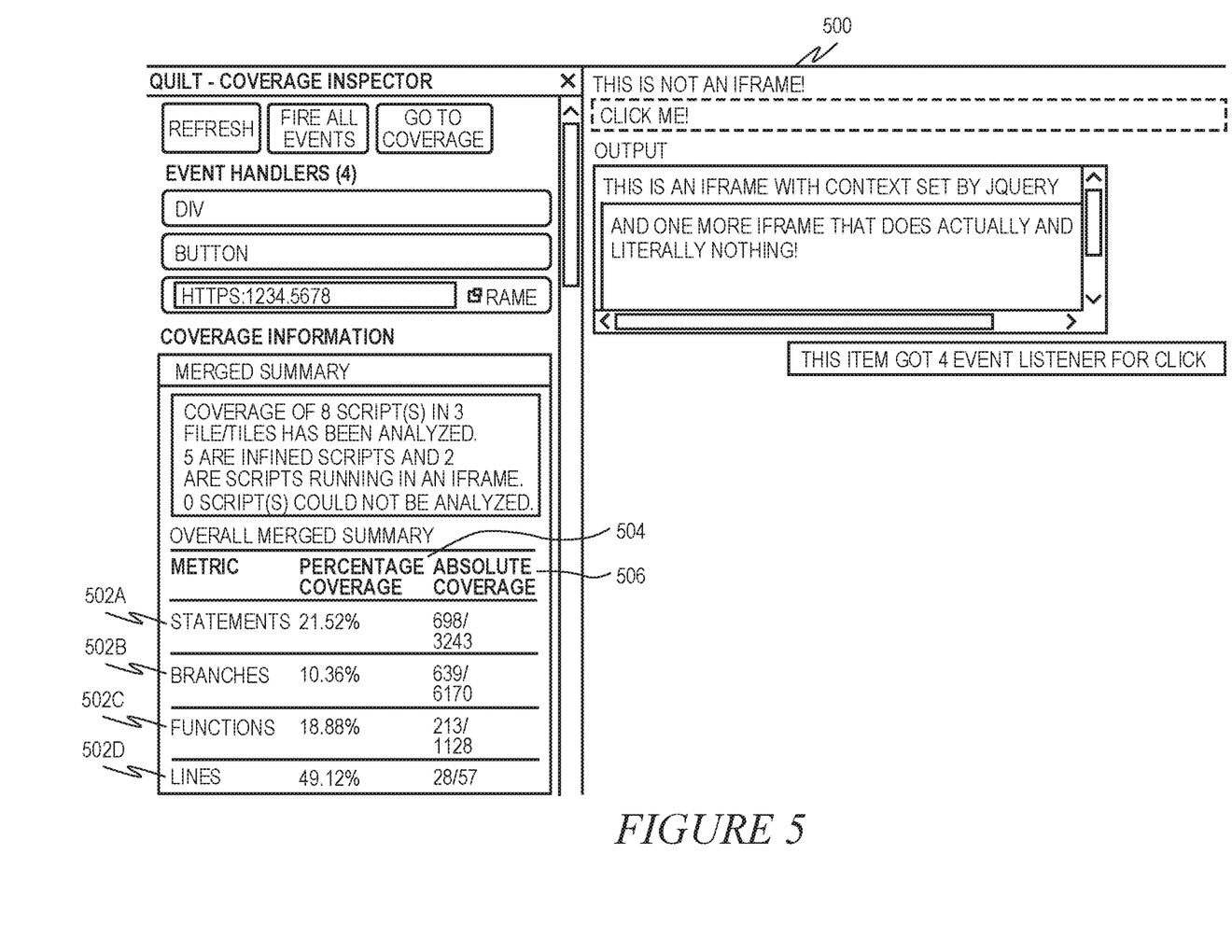
FIG. 5 is a screen capture illustrating a user interface for displaying measurement information related to code coverage, in accordance with an example embodiment.

After injecting this script and retrieving the measurement, the extension computes some summaries by merging the information and displays it to the user. FIG. 5 is a screen capture illustrating a user interface 500 for displaying measurement information related to code coverage, in accordance with an example embodiment. Here, each metric 502A-502D may be displayed as its own row, with columns for percent coverage 504 and absolute coverage 506. Percent coverage 504 indicates the percent of the total code that the metric covered. Absolute coverage gives the number of code lines that the metric covered divided by the total number of code lines.

As aforementioned, dynamic analyses can only make statements about executed code. By providing the developer with information about which portions were already executed, the developer might be able to trigger invocation of code not yet run. To aid the developer in doing so, in an example embodiment, JavaScript's concept of how users interact with pages gets exploited by triggering events on (HTML) elements and therefore causing the invocation of handler routines bound to them.

Additionally, it would be possible to have a graphical source code view embedded into this browser extension that enable the user to browse the code of the application. By highlighting already executed code the user might gain even more detailed insights.

In HTML and JavaScript there are two ways to register a handler for an element in the DOM, DOM Level 0 events ("inline events") are represented by a corresponding property of a HTML element (e.g., a <div> element has a property onlick to which a function can be assigned). The second mechanism (DOM Level 2) adds the methods addEventListener( ) and removeEventListener( ) to most elements allowing multiple event handlers to be registered for a single event on the related element without the need to take care of the multiplexing oneself (as required with DOM Level 0 events).

In order to find these handlers, the extension injects another script into each document of the page. The former are found by simply iterating all existing elements checking their properties. Detecting the latter does not work this way. Instead, the two methods addEventListener( ) and removeEventListener( ) get overridden by methods forwarding to the original ones while additionally maintaining a list of all registered events.

Some of these events regarding the linked event handlers behave differently depending on input data and the sequence of their invocation. In an example embodiment, the events are triggered in the order they have been detected/registered and use provided sample input data in case an event requires it. If these event handlers try to leave the current page, this functionality gets blocked in order to avoid accidentally leaving the page under test.

Figure 6:
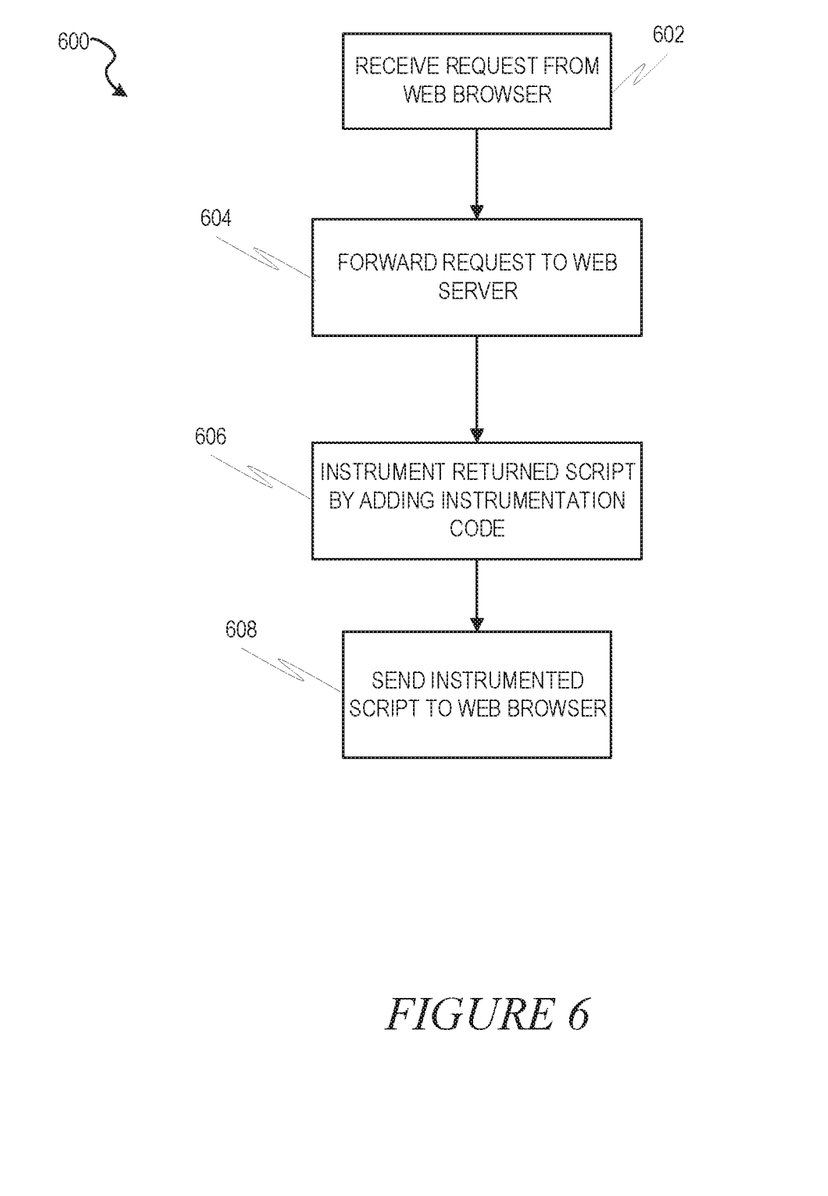
FIG. 6 is a flow diagram illustrating a method, in accordance with an example embodiment, for instrumenting computer code.

FIG. 6 is a flow diagram illustrating a method 600, in accordance with an example embodiment, for instrumenting computer code. At operation 602, a request from a web browser operated on a client device is received at a proxy server. The request includes a call for computer code written in a scripting language. At operation 604, the request is forwarded to a web server to obtain the computer code written in the scripting language. At operation 606. the computer code written in the scripting language is automatically instrumented by adding an instrumentation code to the computer code written in the scripting language. The instrumentation code is configured to, when executed, measure one or more metrics and report the resultant measurements. At operation 608, the instrumented computer code written in the scripting language is sent to the web browser for execution.

EXAMPLES

Example 1. A proxy server comprising:
a proxy core component configured to:
receive a request from a web browser operated on a client device, the request including a call for computer code written in a scripting language; and
forward the request to a web server to obtain the computer code written in the scripting language; and
an instrumentation component configured to:
automatically instrument the computer code written in the scripting language by instrumentation coderewriting it. By this, instrumentation code when executed, the application is measuring one or more metrics and reporting the resultant one or more measurement,
the proxy core component further configured to send the instrumented computer code written in the scripting language to the web browser for execution.

Example 2. The proxy server of Example 1, wherein the instrumentation code is further configured to report the resultant measurements to a specialized add-on to the web browser.

Example 3. The proxy server of Example 2, wherein the specialized add-on causes requests including a call for computer code written in a scripting language to be sent to the proxy server in lieu of directly to the web server.

Example 4. The proxy server of Examples 2 or 3, wherein the specialized add-on is configured to generate code coverage information based on the resultant measurements and display the code coverage information in a graphical user interface.

Example 5. The proxy server of any of Examples 1-4, wherein the automatically instrumenting includes:
assuming that the computer code written in the scripting language is an external script and trying to instrument it as an external script;
if the trying to instrument the computer code written in the scripting language as an external script and trying to instrument it as an external script is unsuccessful, assuming that the computer code written in the scripting language is an embedded script and trying to instrument it as an embedded script.

Example 6. The proxy server of any of Examples 1-5, wherein the instrumentation code is registered as one or more Document Object Model level 0 events.

Example 7. The proxy server of any of Examples 1-6, wherein the instrumentation code is registered as one or more Document Object Model level 2 events.

Example 8. A method comprising:
receiving, at a proxy server, a request from a web browser operated on a client device, the request including a call for computer code written in a scripting language;
forwarding the request to a web server to obtain the computer code written in the scripting language;
automatically instrumenting the computer code written in the scripting language by adding instrumentation code to the computer code written in the scripting language, the instrumentation code configured to, when executed, measure one or more metrics and report the resultant measurements; and
send the instrumented computer code written in the scripting language to the web browser for execution.

Example 9. The method of Example 8, wherein the instrumentation code is further configured to report the resultant measurements to a specialized add-on to the web browser.

Example 10. The method of Example 9, wherein the specialized add-on causes requests including a call for computer code written in a scripting language to be sent to the proxy server in lieu of directly to the web server.

Example 11. The method of Examples 9-10, wherein the specialized add-on is configured to generate code coverage information based on the resultant measurements and display the code coverage information in a graphical user interface.

Example 12. The method of any of Examples 8-11, wherein the automatically instrumenting includes:
assuming that the computer code written in the scripting language is an external script and trying to instrument it as an external script;
if the trying to instrument the computer code written in the scripting language as an external script and trying to instrument it as an external script is unsuccessful, assuming that the computer code written in the scripting language is an embedded script and trying to instrument it as an embedded script.

Example 13. The method of any of Examples 8-12, wherein the instrumentation code is registered as one or more Document Object Model level 0 events.

Example 14. The method of any of Examples 8-13, wherein the instrumentation code is registered as one or more Document Object Model level 2 events.

Example 15. A machine-readable storage medium embodying instructions that, when executed by a machine, cause the machine to perform operations comprising:
receiving, at a proxy server, a request from a web browser operated on a client device, the request including a call for computer code written in a scripting language;
forwarding the request to a web server to obtain the computer code written in the scripting language;
automatically instrumenting the computer code written in the scripting language by adding instrumentation code to the computer code written in the scripting language, the instrumentation code configured to, when executed, measure one or more metrics and report the resultant measurements; and
send the instrumented computer code written in the scripting language to the web browser for execution.

Example 16. The machine-readable storage medium of Example 15, wherein the instrumentation code is further configured to report the resultant measurements to a specialized add-on to the web browser.

Example 17. The machine-readable storage medium of Example 16, wherein the specialized add-on causes requests including a call for computer code written in a scripting language to be sent to the proxy server in lieu of directly to the web server.

Example 18. The machine-readable storage medium of Examples 16 or 17, wherein the specialized add-on is configured to generate code coverage information based on the resultant measurements and display the code coverage information in a graphical user interface.

Example 19. The machine-readable storage medium of any of Examples 15-18, wherein the automatically instrumenting includes:
assuming that the computer code written in the scripting language is an external script and trying to instrument it as an external script;
if the trying to instrument the computer code written in the scripting language as an external script and trying to instrument it as an external script is unsuccessful, assuming that the computer code written in the scripting language is an embedded script and trying to instrument it as an embedded script.

Example 20. The machine-readable storage medium of any of Examples 15-19, wherein the instrumentation code is registered as one or more Document Object Model level 0 events.

Figure 7:
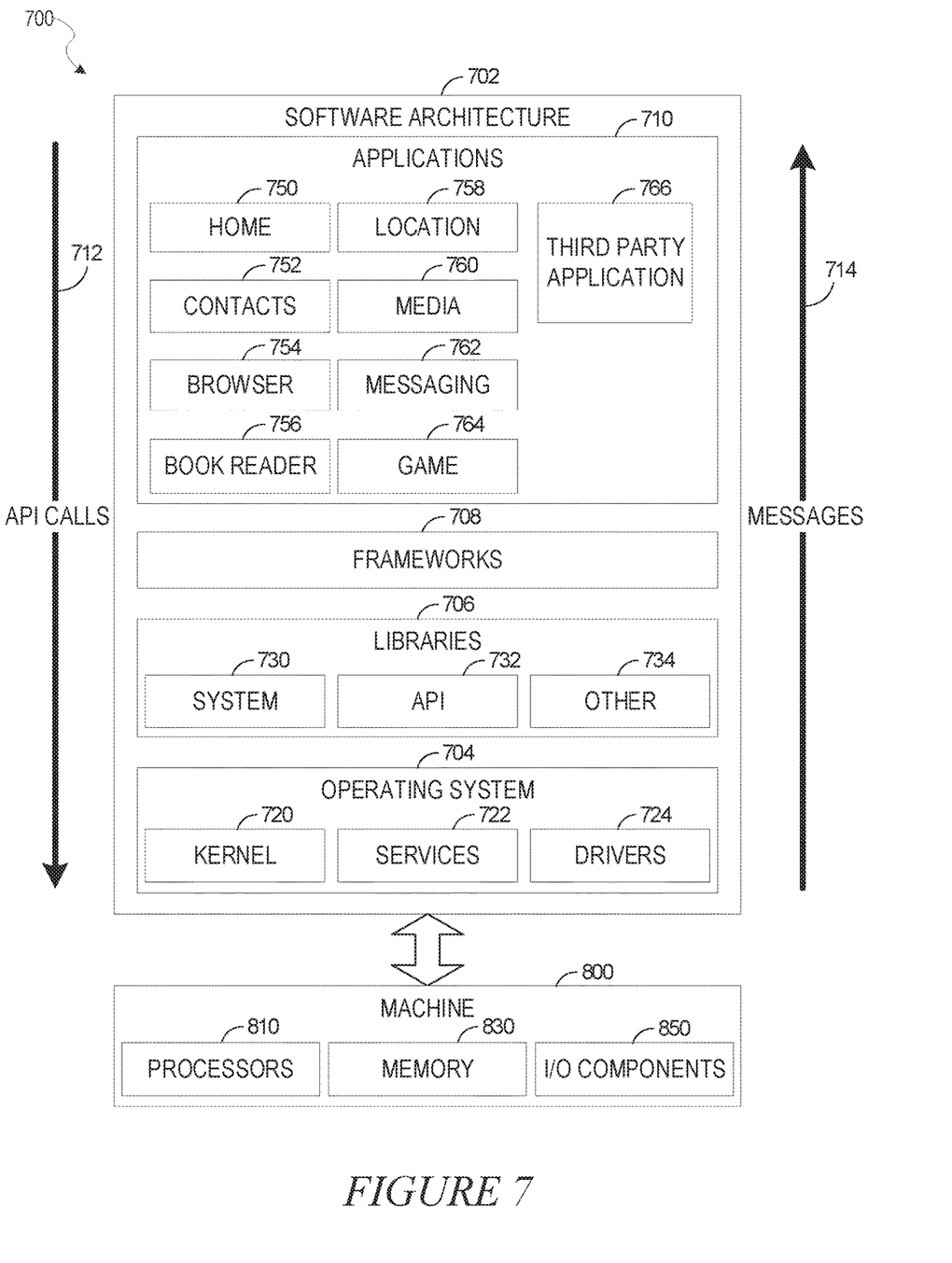
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced. Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
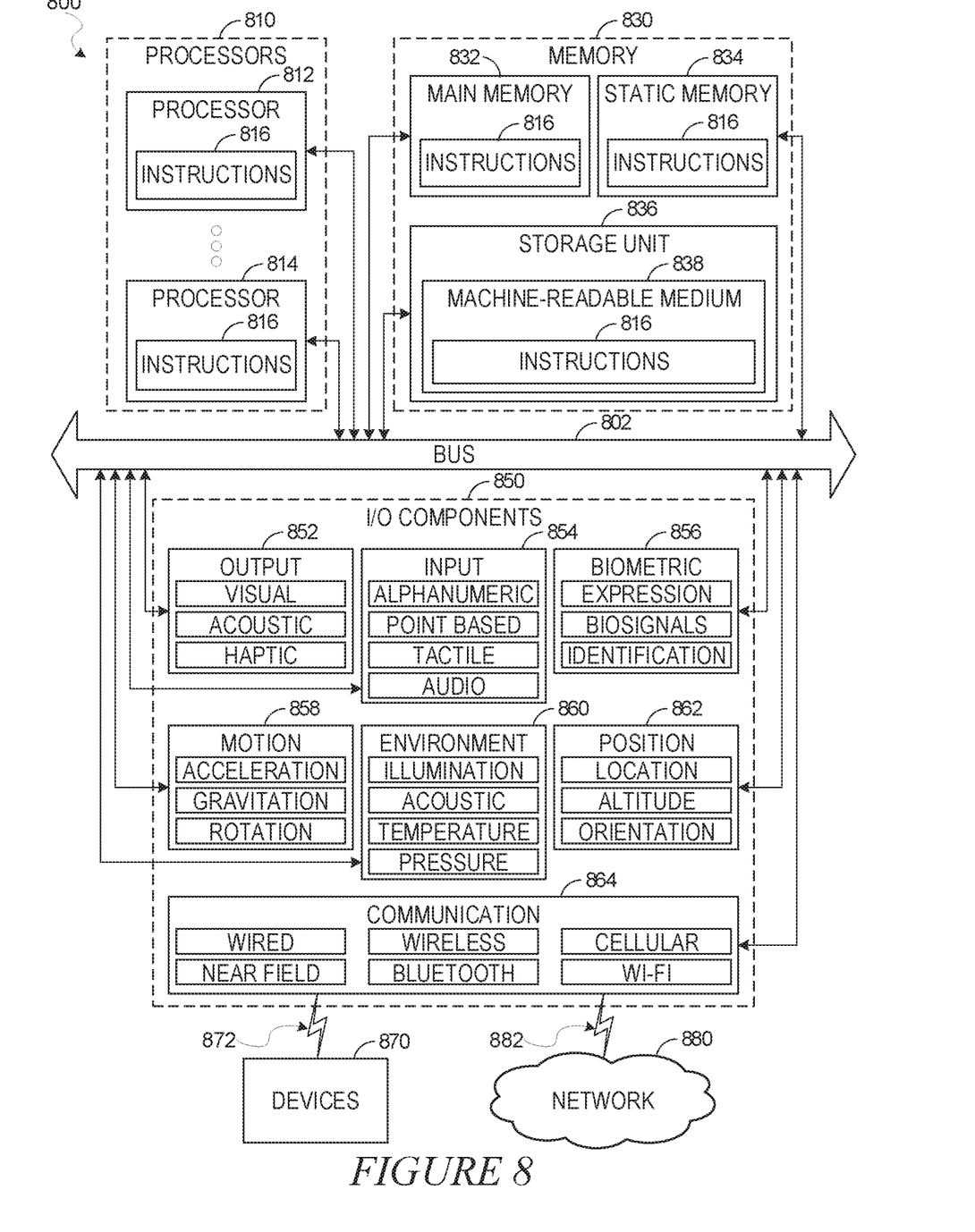
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 800 of FIG. 8. Additionally, or alternatively, the instructions 816 may implement FIGS. 1-6, and so forth. instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836, both accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device, it will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A proxy server comprising:
   a proxy core component configured to:
   receive a request from a specialized add-on that has been added to a web browser operated on a client device, the request including a call for computer code written in a scripting language; and
   forward the request to a web server to obtain the computer code written in the scripting language; and
   an instrumentation component communicatively operating with the web server and configured to:
   automatically instrument said computer code written in the scripting language by adding instrumentation code to the computer code written in the scripting language, the instrumentation code, when executed, measuring one or more metrics and reporting the resultant one or more measurement,
   the proxy core component further configured to
   send the instrumented computer code written in the scripting language to the web browser for execution, the instrumented code including one or more operations to detect event handlers in the computer code by injecting event listener script into the computer code written in the scripting language, the one or more operations including script to block any functionality in the one or more event handlers that cause the web browser to leave a current page.

2. The proxy server of claim 1, wherein the specialized add-on causes requests including a call for computer code written in a scripting language to be sent to the proxy server in lieu of directly to the web server.

3. The proxy server of claim 1, wherein the specialized add-on is configured to generate code coverage information based on the resultant measurements and display the code coverage information in a graphical user interface.

4. The proxy server of claim 1, wherein the automatically instrumenting includes:
   assuming that the computer code written in the scripting language is an external script and trying to instrument it as an external script;
   if the trying to instrument the computer code written in the scripting language as an external script and trying to instrument it as an external script is unsuccessful, assuming that the computer code written in the scripting language is an embedded script and trying to instrument it as an embedded script.

5. The proxy server of claim 1, wherein the instrumentation code is registered as one or more Document Object Model level 0 events.

6. The proxy server of claim 1, wherein the instrumentation code is registered as one or more Document Object Model level 2 events.

7. A method implemented with a processor having memory-stored instructions which, when executed by the processor, cause the processor to perform the method, comprising:
   receiving, at a proxy server, a request from a specialized add-on that has been added to a web browser operated on a client device, the request including a call for computer code written in a scripting language;
   forwarding by the proxy server, the request to a web server to obtain the computer code written in the scripting language;
   automatically instrumenting, using an instrumentation component communicatively operating with the web server, said computer code written in the scripting language by adding instrumentation code to the computer code written in the scripting language, the instrumentation code configured to, when executed, measure one or more metrics and report the resultant measurement; and
   sending, by the proxy server, the instrumented computer code written in the scripting language to the web browser for execution, the instrumented code including one or more operations to detect event handlers in the computer code by injecting event listener script into the computer code written in the scripting language, the one or more operations including script to block any functionality in the one or more event handlers that cause the web browser to leave a current page.

8. The method of claim 7, wherein the specialized add-on causes requests including a call for computer code written in a scripting language to be sent to the proxy server in lieu of directly to the web server.

9. The method of claim 7, wherein the specialized add-on is configured to generate code coverage information based on the resultant measurements and display the code coverage information in a graphical user interface.

10. The method of claim 7, wherein the automatically instrumenting includes:
    assuming that the computer code written in the scripting language is an external script and trying to instrument it as an external script;
    if the trying to instrument the computer code written in the scripting language as an external script and trying to instrument it as an external script is unsuccessful, assuming that the computer code written in the scripting language is an embedded script and trying to instrument it as an embedded script.

11. The method of claim 7, wherein the instrumentation code is registered as one or more Document Object Model level 0 events.

12. The method of claim 7, wherein the instrumentation code is registered as one or more Document Object Model level 2 events.

13. A machine-readable storage medium embodying instructions that, when executed by a machine, cause the machine to perform operations comprising:
    receiving, at a proxy server, a request from a specialized add-on that has been added to a web browser operated on a client device, the request including a call for computer code written in a scripting language;

forwarding by the proxy server, the request to a web server to obtain the computer code written in the scripting language;

automatically instrumenting, using an instrumentation component communicatively operating with the web server, said computer code written in the scripting language by adding instrumentation code to the computer code written in the scripting language, the instrumentation code configured to, when executed, measure one or more metrics and report the resultant measurement; and sending, by the proxy server, the instrumented computer code written in the scripting language to the web browser for execution, the instrumented code including one or more operations to detect event handlers in the computer code by injecting event listener script into the computer code written in the scripting language, the one or more operations including script to block any functionality in the one or more event handlers that cause the web browser to leave a current page.

14. The machine-readable storage medium of claim 13, wherein the specialized add-on causes requests including a call for computer code written in a scripting language to be sent to the proxy server in lieu of directly to the web server.

15. The machine-readable storage medium of claim 13, wherein the specialized add-on is configured to generate code coverage information based on the resultant measurements and display the code coverage information in a graphical user interface.

16. The machine-readable storage medium of claim 13, wherein the automatically instrumenting includes:

assuming that the computer code written in the scripting language is an external script and trying to instrument it as an external script;

if the trying to instrument the computer code written in the scripting language as an external script and trying to instrument it as an external script is unsuccessful, assuming that the computer code written in the scripting language is an embedded script and trying to instrument it as an embedded script.

17. The machine-readable storage medium of claim 13, wherein the instrumentation code is registered as one or more Document Object Model level 0 events.

\* \* \* \* \*